United States Patent
Sakaki (10) Patent No.: US 11,415,854 B2
(45) Date of Patent: Aug. 16, 2022

(54) LIQUID CRYSTAL DISPLAY DEVICE

(71) Applicant: SHARP KABUSHIKI KAISHA, Sakai (JP)

(72) Inventor: Yohichiroh Sakaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/358,577

(22) Filed: Jun. 25, 2021

(65) Prior Publication Data
US 2021/0405492 A1    Dec. 30, 2021

Related U.S. Application Data

(60) Provisional application No. 63/045,465, filed on Jun. 29, 2020.

(51) Int. Cl.
*G02F 1/1362* (2006.01)
*G02F 1/1345* (2006.01)
*G02F 1/1333* (2006.01)

(52) U.S. Cl.
CPC .... *G02F 1/136295* (2021.01); *G02F 1/13452* (2013.01); *G02F 1/133351* (2013.01); *G02F 1/136286* (2013.01)

(58) Field of Classification Search
CPC .............. G02F 1/1345; G02F 1/13452; G02F 1/13454; G02F 1/133351; G02F 1/136286; G02F 1/136295
See application file for complete search history.

(56) References Cited

U.S. PATENT DOCUMENTS

2009/0102824 A1\* 4/2009 Tanaka ................. G09G 3/3648
345/55
2014/0338170 A1 11/2014 Lin

FOREIGN PATENT DOCUMENTS

| CN | 108873521 A | \* 11/2018 | ......... G02F 1/13454 |
| JP | 5881672 B2 | 3/2016 | |
| KR | 20110099477 A | \* 9/2011 | ......... G02F 1/13452 |

\* cited by examiner

*Primary Examiner* — Alexander P Gross
(74) *Attorney, Agent, or Firm* — ScienBiziP, P.C.

(57) ABSTRACT

A liquid crystal display device includes: a liquid crystal display panel having gate bus lines extending along a row direction and source bus lines extending along a column direction; and a gate bus line driving circuit and a source bus line driving circuit. The pixels are disposed in a pixel array region, which includes: a first region where arbitrary displaying takes place; and a second region where exclusively black displaying takes place, the second region adjoining the first region along the column direction. The gate bus lines include a first group of gate bus lines disposed in the first region and a second group of gate bus lines disposed in the second region. The second group of gate bus lines include a first gate bus line connected to the gate bus line driving circuit and second gate bus lines connected to the first gate bus line via an interconnect.

8 Claims, 8 Drawing Sheets

LIQUID CRYSTAL DISPLAY DEVICE

BACKGROUND

1. Technical Field

The present invention relates to a liquid crystal display device.

2. Description of the Related Art

In recent years, as liquid crystal display devices become more prevalent, increasing amounts of them are being abandoned. Therefore, reuse of liquid crystal display devices is desired. In applications such as digital signage, there is a need to enhance visibility and/or eyecatchingness by giving the displaying region an aspect ratio that is significantly different from that of generic displays. Japanese Patent No. 5881672 (hereinafter "Patent Document 1") discloses a method in which a liquid crystal display device is reused after cutting it so that a portion of its displaying region is removed therefrom. A liquid crystal display device which is reused (i.e., resized) in this manner is referred to as a "cut display" in the present specification.

SUMMARY

A peripheral region (frame region) of the liquid crystal display device is shielded from light by a black matrix. However, when producing a cut display, a portion (i.e., a portion near the side along which the cut is made) of the black matrix in the peripheral region is removed. Moreover, gate bus lines which are no longer connected to gate drivers may exist along the side along which the cut was made. Pixel rows that correspond to any such gate bus lines may constitute a region of unstable displaying, and therefore need to be covered by a bezel or the like. However, when the accuracy of attachment for the bezel is poor, the region of unstable displaying cannot be adequately covered, whereby leakage of light or the like may occur.

The present invention has been made in view of the above problems, and an objective thereof is to provide a liquid crystal display device that is suitably used as a cut display.

The present specification discloses liquid crystal display devices and methods of producing liquid crystal display devices as recited in the following Items.

[Item 1]
A liquid crystal display device having a plurality of pixels arranged in a matrix including multiple rows and multiple columns, comprising:
a liquid crystal display panel, including a first substrate, a second substrate opposed to the first substrate, a liquid crystal layer interposed between the first substrate and the second substrate, a plurality of gate bus lines extending along a row direction, and a plurality of source bus lines extending along a column direction; and
a gate bus line driving circuit and a source bus line driving circuit, wherein,
the plurality of pixels are disposed in a pixel array region, the pixel array region including:
a first region where arbitrary displaying takes place; and
a second region where exclusively black displaying takes place, the second region adjoining the first region along the column direction;
the plurality of gate bus lines include a first group of gate bus lines disposed in the first region and a second group of gate bus lines disposed in the second region; and
the second group of gate bus lines include a first gate bus line connected to the gate bus line driving circuit and a plurality of second gate bus lines connected to the first gate bus line via an interconnect.

[Item 2]
The liquid crystal display device of Item 1, wherein the plurality of second gate bus lines comprise five or more gate bus lines.

[Item 3]
The liquid crystal display device of Item 1 or 2, wherein,
the pixel array region further includes a third region adjoining the second region along the column direction and being located on an opposite side of the second region from the first region;
the plurality of gate bus lines further include a third group of gate bus lines disposed in the third region; and
the third group of gate bus lines are not connected to the gate bus line driving circuit.

[Item 4]
The liquid crystal display device of Item 3 further comprising a bezel that covers a portion of the second region and the third region when viewed from a normal direction of the display surface.

[Item 5]
The liquid crystal display device of any of Items 1 to 4, wherein,
the first substrate comprises the plurality of gate bus lines, the plurality of source bus lines, and the interconnect; and
the interconnect is provided above or below the second group of gate bus lines via an insulating layer, each of the second group of gate bus lines being connected to the interconnect through a contact hole made in the insulating layer.

[Item 6]
The liquid crystal display device of any of Items 1 to 5, wherein the interconnect is made of a same electrically conductive film as the plurality of source bus lines.

[Item 7]
A method of producing a liquid crystal display device that is a resized version of an original liquid crystal display device, the method comprising:
step (a) of providing a liquid crystal display device that includes a liquid crystal display panel having a plurality of gate bus lines extending along a row direction and a plurality of source bus lines extending along a column direction;
step (b) of distinguishing the liquid crystal display panel of the liquid crystal display device into a reused region to be reused and a cut-off region to be cut off, and cutting the liquid crystal display panel at a boundary between the reused region and the cut-off region; and
step (c) of forming a sealing portion at a cutting surface having been created in the reused region at step (b), wherein,
the liquid crystal display panel of the liquid crystal display device provided at step (a) further includes an interconnect extending along the column direction, the interconnect intersecting all or some of the plurality of gate bus lines via an insulating layer;
the reused region after being subjected to step (b) includes a plurality of gate bus lines that are connected to a gate bus line driving circuit and a plurality of gate bus lines that are not connected to the gate bus line driving circuit; and
the method comprises, after step (b), step (d) of causing at least one gate bus line among the plurality of gate bus lines that are connected to the gate bus line driving circuit and two or more gate bus lines among the plurality of gate bus lines that are not connected to the gate bus line driving circuit to become connected via the interconnect.

[Item 8]

The method of producing a liquid crystal display device of Item 7, further comprising, after step (d), step (e) of separating the interconnect into a continuous first portion that includes a portion intersecting the at least one gate bus line and the two or more gate bus lines; and a second portion other than the first portion.

According to an embodiment of the present invention, a liquid crystal display device that is suitably used as a cut display can be provided.

BRIEF DESCRIPTION OF THE DRAWINGS

Hereinafter, with reference to the drawings, an embodiment of the present invention will be described. Note that the present invention is not to be limited to the following embodiment.

Figure 1:
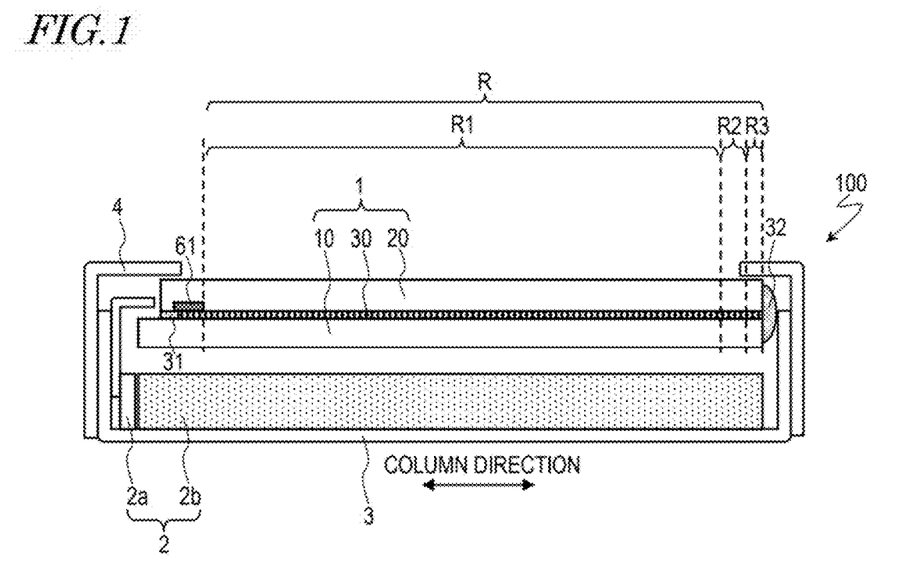
FIG. 1 is a cross-sectional view schematically showing a liquid crystal display device 100 according to an embodiment of the present invention.
Figure 2:
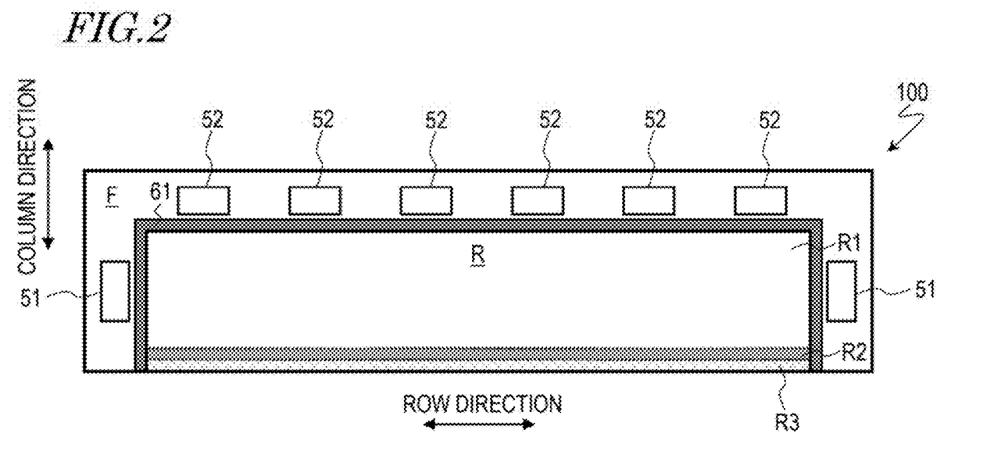
FIG. 2 is a plan view schematically showing the liquid crystal display device 100.
Figure 3:
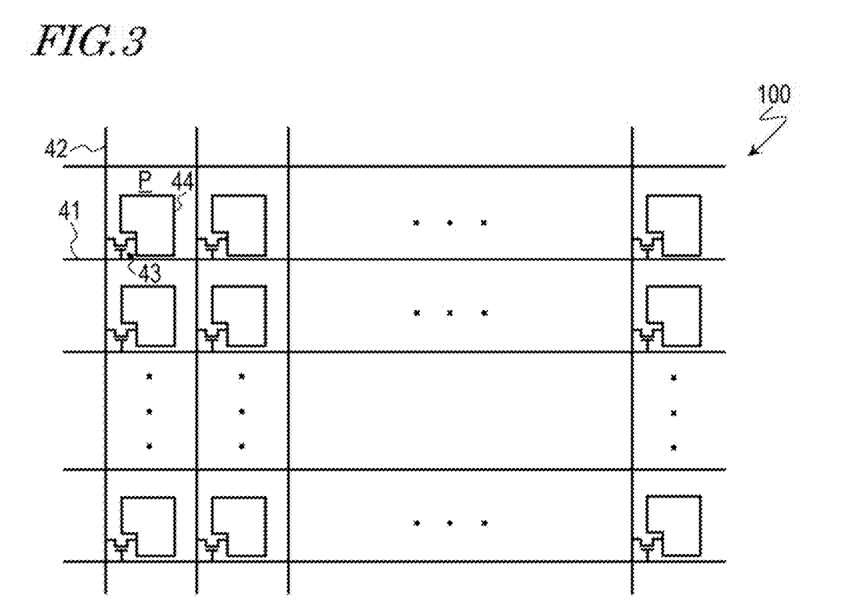
FIG. 3 is an equivalent circuit diagram of a plurality of pixels P of the liquid crystal display device 100.

With reference to FIG. 1, FIG. 2 and FIG. 3, a liquid crystal display device 100 according to an embodiment of the present invention will be described. FIG. 1 and FIG. 2 are a cross-sectional view and a plan view, respectively, schematically showing the liquid crystal display device 100. FIG. 3 is an equivalent circuit diagram of a plurality of pixels P of the liquid crystal display device 100.

The liquid crystal display device 100 is a cut display that has been obtained by resizing a liquid crystal display device for reuse. As shown in FIG. 1, the liquid crystal display device 100 includes: a liquid crystal display panel 1; and a backlight (lighting device) 2 disposed at the rear face side (i.e., the opposite side from the viewer's side) of the liquid crystal display panel 1.

The liquid crystal display panel 1 includes: an active matrix substrate (first substrate) 10; a counter substrate (second substrate) 20 opposed to the active matrix substrate 10; and a liquid crystal layer 30 interposed between the active matrix substrate 10 and the counter substrate 20. The liquid crystal layer 30 is sealed by a first sealing portion 31 and a second sealing portion 32. The first sealing portion 31 is a sealing portion which belonged in the original liquid crystal display device, whereas the second sealing portion 32 is a sealing portion that was newly formed when producing the liquid crystal display device 100.

The backlight 2 includes a light source(s) 2a and a light guide plate 2b that allows the light emitted from the light source(s) 2a to be led to the liquid crystal display panel 1. The light source(s) 2a may be an LED(s), for example. Between the light guide plate 2b and the liquid crystal display panel 1, a plurality of optical films may be disposed. Although an edge light-type backlight 2 is illustrated herein, a direct-type backlight may instead be used.

The liquid crystal display panel 1 and the backlight 2 are supported by a back chassis 3. A portion (near its outer periphery) of the liquid crystal display panel 1 is covered by a bezel 4. Note that the shapes of the back chassis 3 and the bezel 4 are not limited to what is exemplified herein.

As shown in FIG. 3, the liquid crystal display device 100 include a plurality of pixels P. The plurality of pixels P are arranged in a matrix including multiple rows and multiple columns. On the liquid crystal display panel 1, a plurality of gate bus lines 41 extending along the row direction and a plurality of source bus lines 42 extending along the column direction are provided. In each pixel P, a TFT (thin film transistor) 43, and a pixel electrode 44 are disposed. A gate electrode of the TFT 43 is connected to a corresponding gate bus line 41. A source electrode of the TFT 43 is connected to a corresponding source bus line 42, and a drain electrode of the TFT 43 is connected to the pixel electrode 44. The aforementioned gate bus lines 41, source bus lines 42, TFTs 43, and pixel electrodes 44 are provided on the active matrix substrate 10.

As shown in FIG. 1 and FIG. 2, the liquid crystal display device 100 includes: a pixel array region R, which is a region where the plurality of pixels P are disposed; and a peripheral region (frame region) F, which is located around the pixel array region R. The peripheral region F has a substantial U shape surrounding the pixel array region R on three sides.

In the peripheral region F, a plurality of gate drivers 51 and a plurality of source drivers 52 are provided. In the present specification, all of the gate drivers 51 may be collectively referred to as the "gate bus line driving circuit". Similarly, all of the source drivers 52 may be collectively referred to as a "source bus line driving circuit". Each of the plurality of gate drivers 51 supplies a scanning signal to a corresponding gate bus line 41. Each of the plurality of source drivers 52 supplies a display signal to a corresponding source bus line 42. For example, the gate drivers 51 may be monolithically formed on the active matrix substrate 10, while the source drivers 52 may be mounted in COG (Chip On Glass) fashion, etc. Note that the number of gate drivers 51 and source drivers 52 are not limited to what is illustrated in FIG. 2.

Moreover, in the peripheral region F, a black matrix (light shielding layer) 61 is disposed so as to surround the pixel array region R on three sides. Typically, the black matrix 61 is provided on the counter substrate 20.

The display mode of the liquid crystal display device 100 may be any of various known display modes. A vertical field mode such as the TN (Twisted Nematic) mode or the VA (Vertical Alignment) mode may be used, or a lateral field mode such as the FFS (Fringe-Field Switching) mode may be used.

In the liquid crystal display device 100 according to the present embodiment, as shown in FIG. 1 and FIG. 2, the pixel array region R includes three regions: a first region R1, a second region R2, and a third region R3.

The first region R1 is a region where arbitrary displaying takes place. In other words, in the first region R1, a desired image (information) is to be displayed in accordance with an input image signal. The first region R1 is a region corresponding to a "displaying region" of a generic liquid crystal display device. In the present specification, the first region R1 may also be referred to as an "effective displaying region".

The second region R2 is located at one end of the liquid crystal display device 100 along its column direction (i.e., on the opposite side from an end at which the source drivers 52 are provided). The second region R2 adjoins the first region R1 along the column direction. The second region R2 is a region where exclusively black displaying takes place. As will be described later, the second region R2 may function as a pseudo black matrix.

The third region R3 is located at one end of the liquid crystal display device 100 along its column direction (i.e., on the opposite side from an end at which the source drivers 52 are provided). The third region R3 adjoins the second region R2 along the column direction. The third region R3 is located on the opposite side of the second region R2 from the first region R1.

Figure 4:
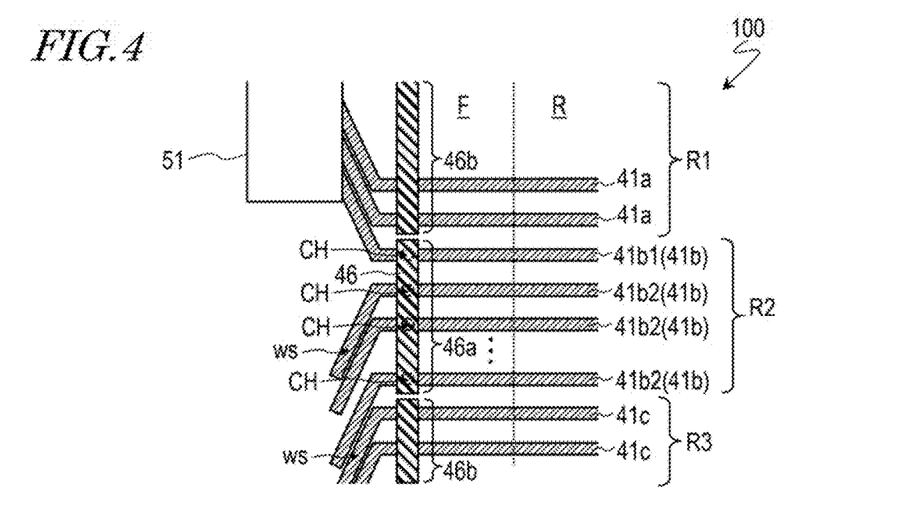
FIG. 4 is a plan view showing enlarged the neighborhoods of a second region R2 and a third region R3 of the liquid crystal display device 100.
Figure 5:
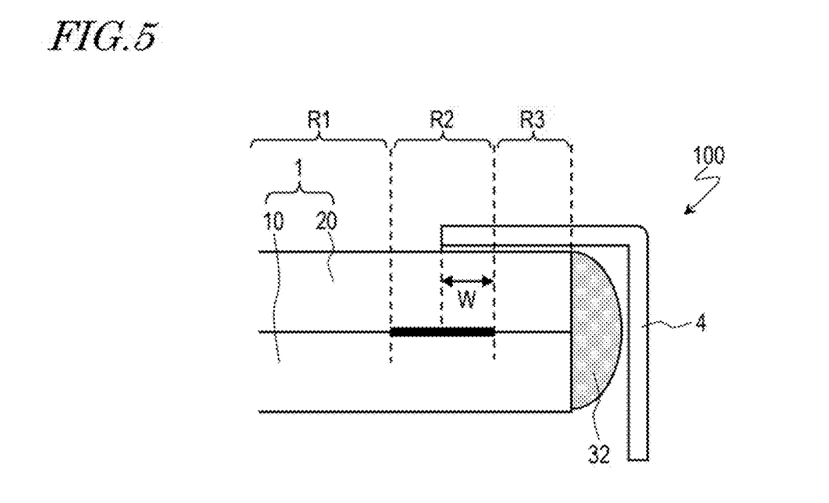
FIG. 5 is a cross-sectional view showing enlarged the neighborhoods of the second region R2 and the third region R3 of the liquid crystal display device 100.

Hereinafter, with reference also to FIG. 4 and FIG. 5, the first region R1, the second region R2, and the third region R3 will be described. FIG. 4 and FIG. 5 are a plan view and a cross-sectional view, respectively, showing enlarged the neighborhoods of the second region R2 and the third region R3.

As shown in FIG. 4, the plurality of gate bus lines 41 of the liquid crystal display device 100 include a first group of gate bus lines 41a disposed in the first region R1, a second group of gate bus lines 41b disposed in the second region R2, and a third group of gate bus lines 41c disposed in the third region.

The first group of gate bus lines 41a are all connected to the gate bus line driving circuit. The second group of gate bus lines 41b include one first gate bus line 41b1 that is connected to the gate bus line driving circuit, and a plurality of second gate bus lines 41b2 that are connected to the first gate bus line 41b1 via an interconnect 46. The third group of gate bus lines 41c are not connected to the gate bus line driving circuit. Although the second gate bus lines 41b2 and the third group of gate bus lines 41c each have a lead-out portion ws, note that the gate bus line driving circuit is not connected to the lead-out portions ws of the second gate bus lines 41b2 and the third group of gate bus lines 41c.

The aforementioned gate bus lines 41, source bus lines 42, and the interconnect 46 are provided on the active matrix substrate 10. The interconnect 46 is provided in the peripheral region F. The interconnect 46 extends along the column direction, and intersects all or some of the plurality of gate bus lines 41 via an insulating layer. The interconnect 46 is separated into: a continuous first portion 46a that includes a portion intersecting the second group of gate bus lines 41b; and second portions 46b, which are other than the first portion 46a. The interconnect 46 is provided above or below the second group of gate bus lines 41b via an insulating layer, such that each of the second group of gate bus lines 41b is connected to the interconnect 46 through a contact hole CH formed in the insulating layer. In the illustrated example, the interconnect 46 is provided above the second group of gate bus lines 41b, and is made of the same electrically conductive film (source metal film) as the source bus lines 42. The second gate bus lines 41b2 in the second group are connected to the gate bus line driving circuit via the interconnect 46 and the first gate bus line 41b1. In other words, the second gate bus lines 41b2 are indirectly connected to the gate bus line driving circuit. On the other hand, the first gate bus line 41b1 in the second group is directly connected to the gate bus line driving circuit. Moreover, the first group of gate bus lines 41a are directly connected to the gate bus line driving circuit, whereas the third group of gate bus lines 41c are not connected, directly or indirectly, to the gate bus line driving circuit.

As has already been described, exclusively black displaying takes place in the second region R2. Next to the last row in the first group of gate bus lines 41a, a gate voltage (scanning signal) is applied to the first gate bus line 41b1 in the second group of gate bus lines 41b from the gate bus line driving circuit. At this time, via the first gate bus line 41b1 and the interconnect 46, a gate voltage is applied to the second gate bus lines 41b2 in the second group of gate bus lines 41b. As a result, the TFTs 43 that are connected to the first gate bus line 41b1 and the second gate bus lines 41b2 in the second group of gate bus lines 41b are simultaneously turned ON. While in this state, a source voltage (display signal) that corresponds to black displaying is supplied from the source bus line 42 to the TFTs 43. In this manner, black displaying takes place in the second region R2.

As shown in FIG. 5, when viewed from the normal direction of the display surface, the bezel 4 at least covers the third region R3. More specifically, when viewed from the normal direction of the display surface, the bezel 4 covers a portion of the second region R2 and the third region R3.

The liquid crystal display device 100 can be produced in the following manner, for example.

Figure 6A:
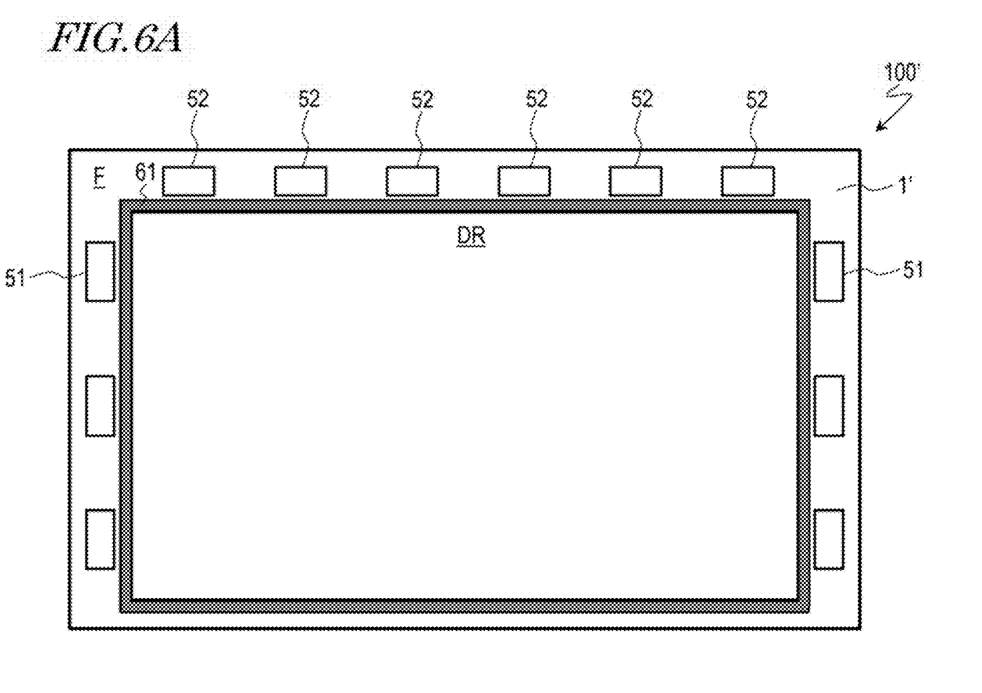
FIG. 6A is a plan view for describing a method of producing the liquid crystal display device 100.

First, as shown in FIG. 6A, an original liquid crystal display device 100' is provided. The liquid crystal display device 100' includes a liquid crystal display panel 1', a plurality of gate drivers 51, and a plurality of source drivers 52. The liquid crystal display panel 1' of the liquid crystal display device 100' is sized larger than the liquid crystal display panel 1 of the liquid crystal display device 100. The liquid crystal display device 100' includes more gate drivers 51 than there are gate drivers 51 in the liquid crystal display device 100. The liquid crystal display device 100' includes: a displaying region DR; and a peripheral region F, which is located around the displaying region DR. Furthermore, the liquid crystal display device 100' includes a black matrix (light shielding layer) 61 provided in the peripheral region F. The black matrix 61 surrounds the displaying region DR on four sides.

Figure 6B:
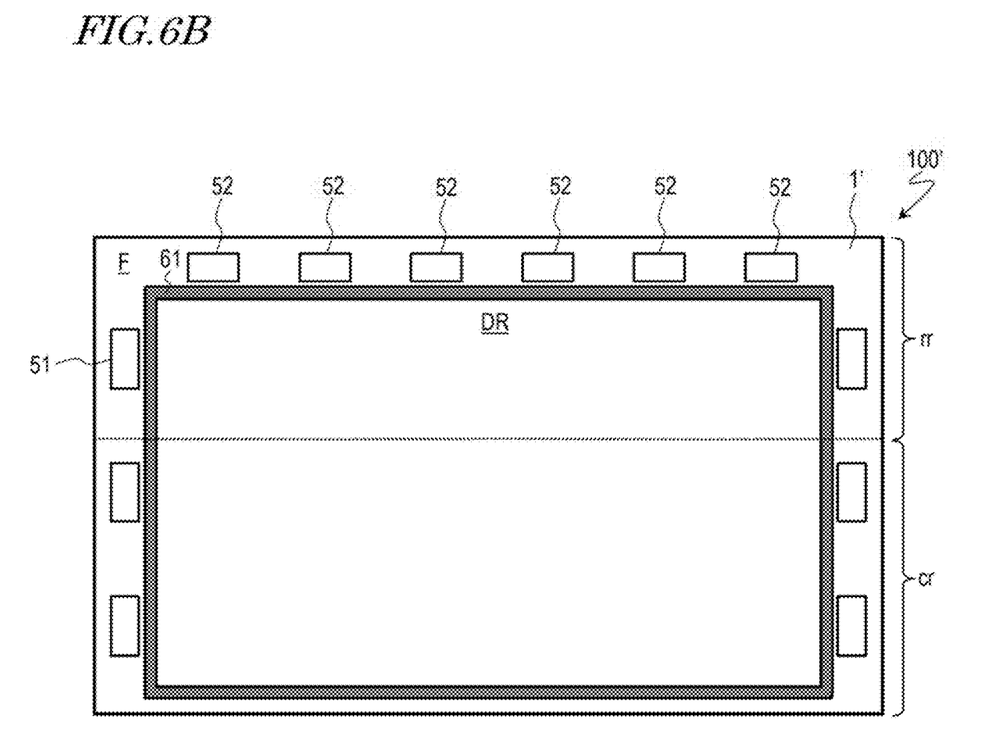
FIG. 6B is a plan view for describing a method of producing the liquid crystal display device 100.

Next, as shown in FIG. 6B, the liquid crystal display panel 1' is distinguished into a reused region rr to be reused and a cut-off region cr to be cut off.

Figure 6C:
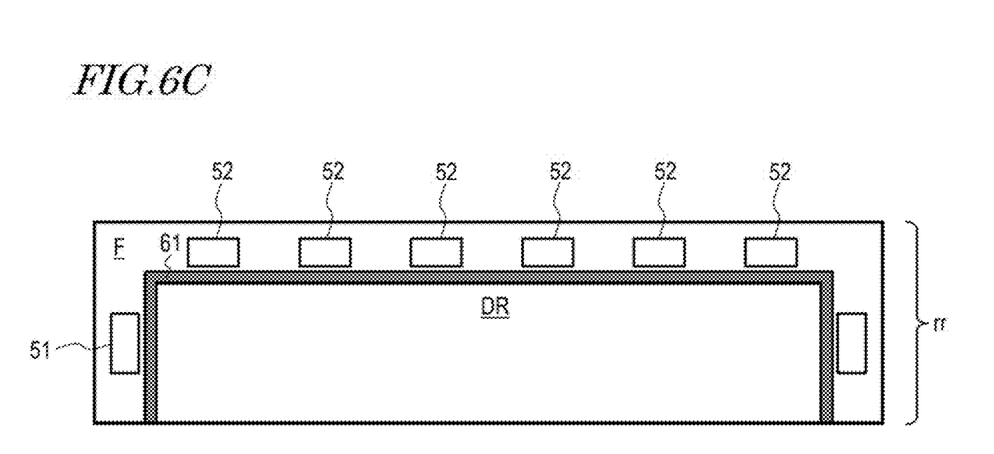
FIG. 6C is a plan view for describing a method of producing the liquid crystal display device 100.
Figure 6D:
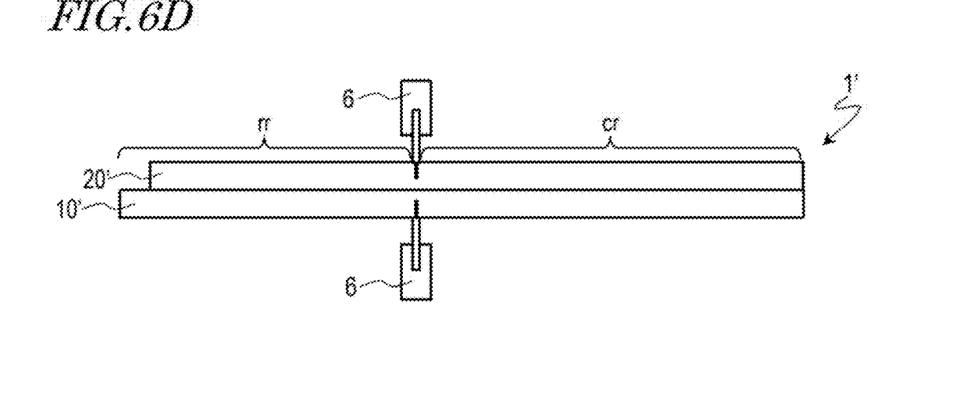
FIG. 6D is a side view for describing a method of producing the liquid crystal display device 100.
Figure 6E:
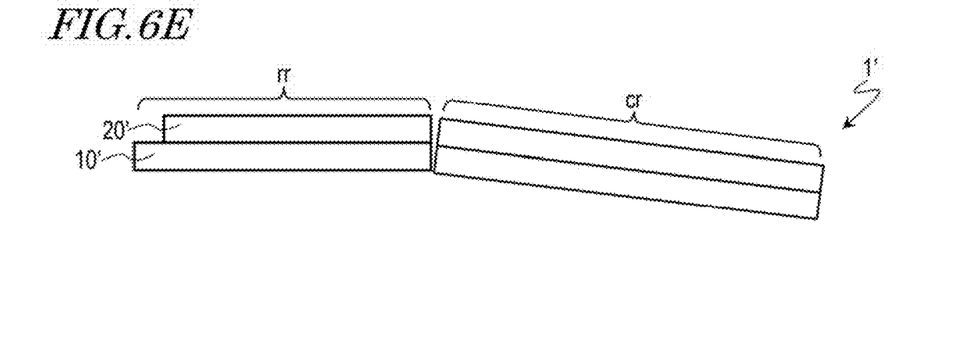
FIG. 6E is a side view for describing a method of producing the liquid crystal display device 100.

Next, as shown in FIG. 6C, the liquid crystal display panel 1' is cut at the boundary between the reused region rr and the cut-off region cr. The cut may be performed by, for example, making an incision in each of the substrates (i.e., the active matrix substrate 10' and the counter substrate 20') by using a scribing wheel 6 as shown in FIG. 6D, and thereafter splitting the active matrix substrate 10' and the counter substrate 20' along the incision as shown in FIG. 6E. Through this cutting, the cut-off region cr is removed. Therefore, a portion of the displaying region DR and a portion of the peripheral region F are removed. As a result of this, a portion of the black matrix 61 and some of the gate drivers 51 are also removed. Furthermore, among the gate bus lines that were connected to the removed gate drivers 51, those gate bus lines which are located in the reused region rr (specifically, the gate bus lines near the cutting surface) are isolated from the gate drivers 51, so that they are no longer connected to the gate drivers 51.

Figure 6F:
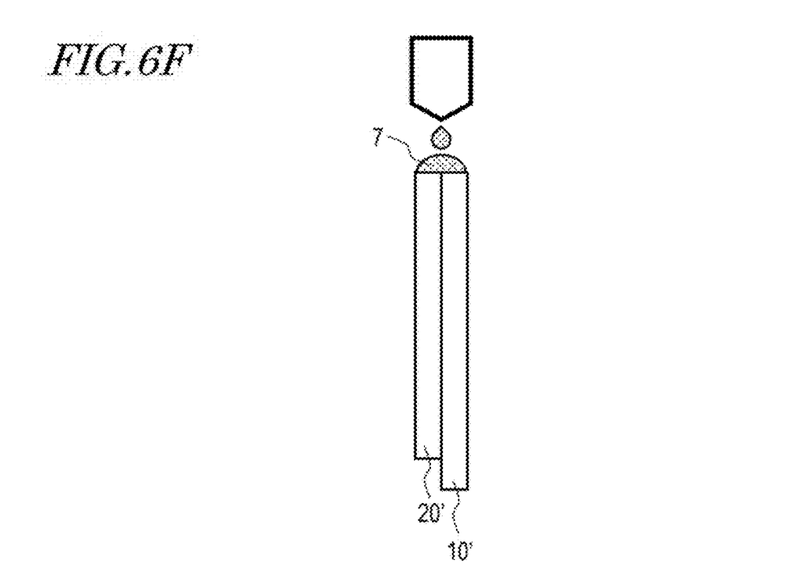
FIG. 6F is a side view for describing a method of producing the liquid crystal display device 100.

Next, a second sealing portion 32 is formed in the cutting surface created in the reused region rr in order to seal the liquid crystal material. For example, as shown in FIG. 6F, the active matrix substrate 10' and the counter substrate 20' after cutting may be tilted by approximately 90°; thereafter a UV-curing resin material 7 may be applied on the cutting surface; and then the applied UV-curing resin material may be irradiated with ultraviolet, thereby forming the second sealing portion 32.

Figure 6G:
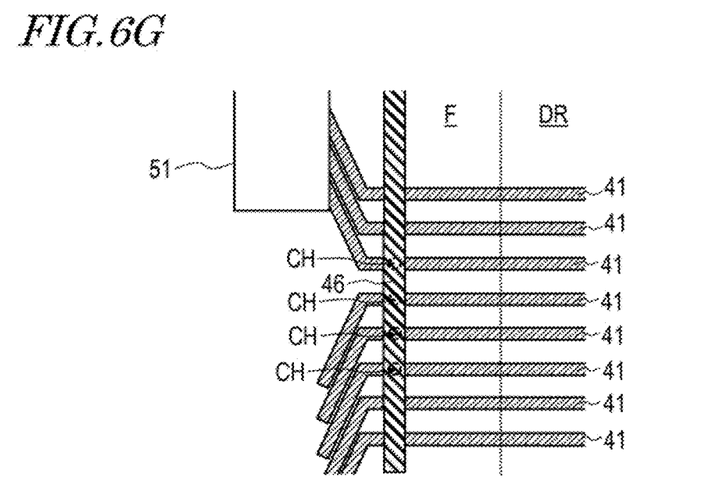
FIG. 6G is a plan view for describing a method of producing the liquid crystal display device 100.

Next, as shown in FIG. 6G, some of the gate bus lines 41 and the interconnect 46 are connected. Specifically, at least one of the gate bus lines 41 connected to the gate bus line driving circuit (gate drivers 51) (e.g., one in the lowest row herein) and a plurality (i.e., two or more) of gate bus lines 41 located therebelow are connected via the interconnect 46. This connection may be achieved by laser light irradiation, for example. Through laser light irradiation, the wiring material is melted and contact holes CH are formed in the insulating layer.

Figure 6H:
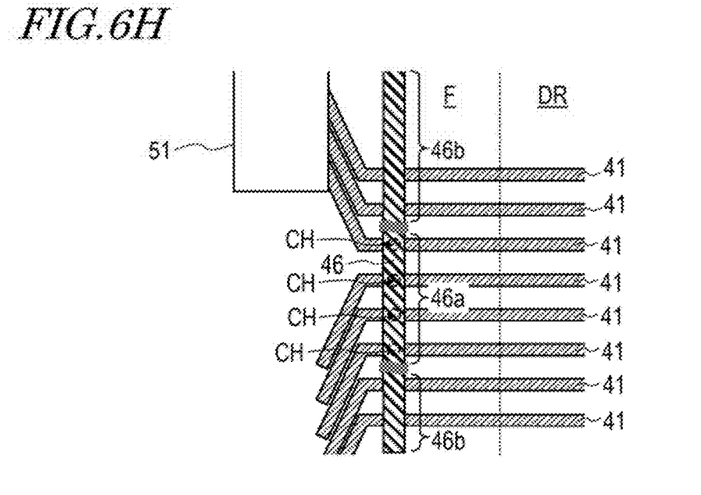
FIG. 6H is a plan view for describing a method of producing the liquid crystal display device 100.

Thereafter, as shown in FIG. 6H, the interconnect is cut. Specifically, the interconnect 46 is cut at positions (two places) corresponding to the boundaries between the gate bus line(s) 41 connected to the interconnect and the unconnected gate bus lines 41. That is, the interconnect 46 is separated into: a continuous first portion 46a that includes a portion intersecting the gate bus line(s) 41 connected to the interconnect 46; and second portions 46b other than the first portion 46a. The cutting of the interconnect 46 may be achieved by laser light irradiation, for example. In this manner, the liquid crystal display device 100 is obtained.

As described above, in the liquid crystal display device 100 according to the present embodiment, the pixel array region R, which is defined by the plurality of pixels P, includes the second region R2 where exclusively black displaying takes place, this second region R2 functioning as a pseudo black matrix. This allows the liquid crystal display device 100 to be suitably used as a cut display. For example, by covering a portion of the second region R2 and the third region R3 with the bezel 4, even if the accuracy of attachment of the bezel 4 is poor, leakage of light due to the third region R3 being susceptible to unstable displaying can be better suppressed. Moreover, in the liquid crystal display device 100 according to the present embodiment, the second group of gate bus lines 41b include: the first gate bus line(s) 41b1 connected to the gate bus line driving circuit; and the plurality of second gate bus lines 41b2 connected to the first gate bus line(s) 41b1 via an interconnect. Some advantageous effects that are obtained from this will be described in contrast with a liquid crystal display device 200 according to Comparative Example 1 (illustrated in FIG. 7A and FIG. 7B) and a liquid crystal display device 300 according to Comparative Example 2 (illustrated in FIG. 8).

Figure 7A:
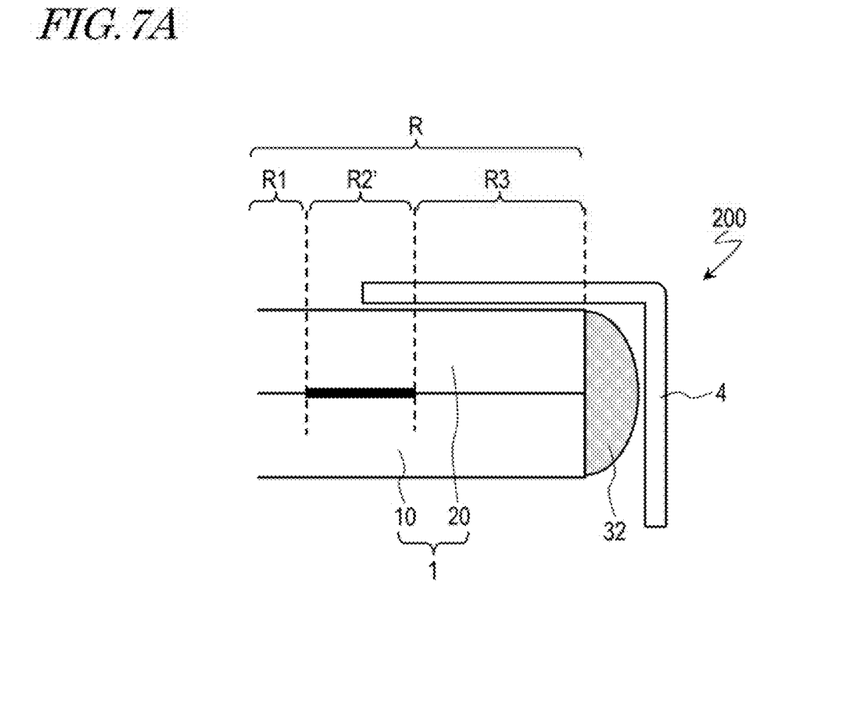
FIG. 7A is a cross-sectional view schematically showing a liquid crystal display device 200 according to Comparative Example 1.
Figure 7B:
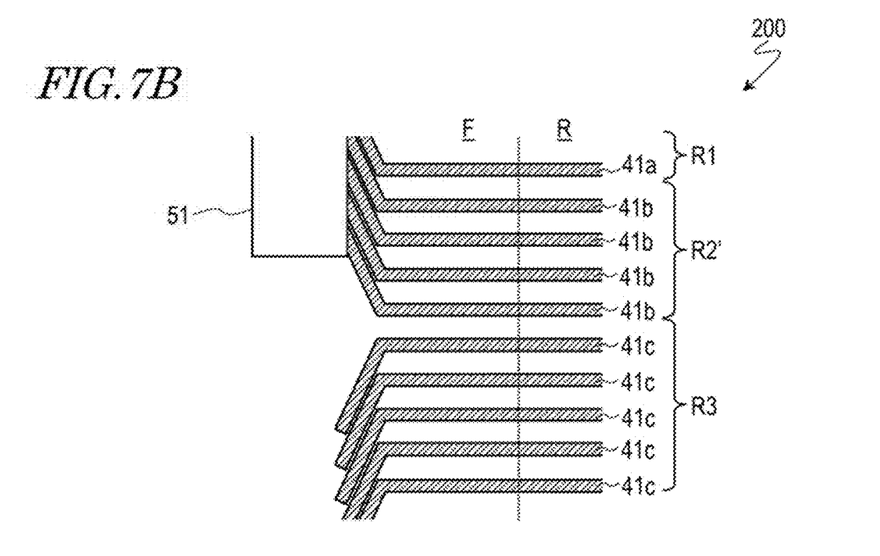
FIG. 7B is a plan view schematically showing the liquid crystal display device 200.

A pixel array region R of the liquid crystal display device 200 according to Comparative Example 1 shown in FIG. 7A and FIG. 7B includes three regions: a first region R1, a second region R2', and a third region R3.

The first region R1 is an effective displaying region where arbitrary displaying takes place.

The second region R2' adjoins the first region R1 along the column direction. The second region R2' is a region where exclusively black displaying takes place. The second region R2' is capable of functioning as a pseudo black matrix.

The third region R3 adjoins the second region R2' along the column direction. The third region R3 is located on the opposite side of the second region R2' from the first region R1.

The liquid crystal display device 200 includes a plurality of gate bus lines 41, including: a first group of gate bus lines 41a disposed in the first region R1; a second group of gate bus lines 41b disposed in the second region R2'; and a third group of gate bus lines 41c disposed in the third region R3.

The first group of gate bus lines 41a are all connected to a gate bus line driving circuit. The second group of gate bus lines 41b are all connected to the gate bus line driving circuit. None of the third group of gate bus lines 41c is connected to the gate bus line driving circuit.

Thus, in the liquid crystal display device 200 according to Comparative Example 1, the second group of gate bus lines 41b disposed in the second region R2' are all directly connected to the gate bus line driving circuit. In other words, the second group of gate bus lines 41b do not include any gate bus lines that are indirectly connected to the gate bus line driving circuit.

In the liquid crystal display device 200 according to Comparative Example 1, the second region R2' may be allowed to function as a pseudo black matrix. However, design freedom may decrease, and/or the region covered by the bezel 4 may increase.

On the other hand, in the liquid crystal display device 100 according to the present embodiment, the second group of gate bus lines 41b disposed in the second region R2 include: the first gate bus line(s) 41b1 connected to gate bus line driving circuit; and the plurality of second gate bus lines 41b2 connected to the first gate bus line 41b1 via an interconnect (i.e., pixel rows corresponding to any gate bus lines 41b2 that are indirectly connected to the gate bus line driving circuit are also allowed to function as a pseudo black matrix). This increases design freedom, and reduces the region covered by the bezel 4.

Figure 8:
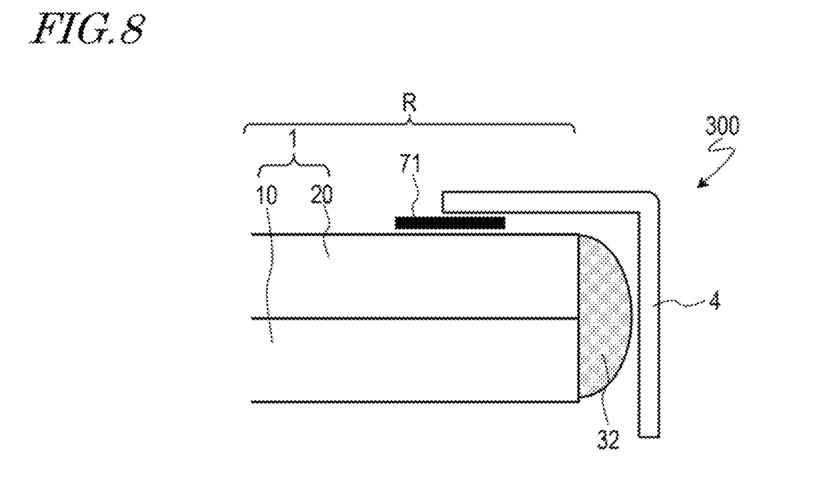
FIG. 8 is a cross-sectional view schematically showing a liquid crystal display device 300 according to Comparative Example 2.

A pixel array region R of the liquid crystal display device 300 according to Comparative Example 2 shown in FIG. 8, unlike that of the liquid crystal display device 100 according to the present embodiment, does not include any region functioning as a pseudo black matrix (i.e., a region corresponding to the second region R2). Instead, in the liquid crystal display device 300, a light shielding tape 71 is attached near the cutting surface (i.e., near the second sealing portion 32).

However, it is difficult to attach the light shielding tape 71 with a high accuracy, thus resulting in lower workability or poorer appearance. Moreover, the light shielding tape 71 may deform for temperature-related or other reasons.

On the other hand, in the liquid crystal display device 100 according to the present embodiment, the aforementioned problems do not occur because a portion (second region R2) of the pixel array region R functions as a pseudo black matrix.

Thus, the liquid crystal display device 100 according to the present embodiment can be suitably used as a cut display.

From the standpoint of allowing the second region R2 to suitably function as a pseudo black matrix, the width (i.e., the size along the column direction) of the second region R2 is preferably 2 mm or more, and preferably there are five or more second gate bus lines 41b2, for example.

An overlap width W of the bezel 4 with the second region R2 (see FIG. 5) is preferably set while taking into consideration the accuracy of attachment of the bezel 4, and may be 1 mm or more, for example.

In the present embodiment, the second group of gate bus lines 41b include one first gate bus line 41b1. However, this is not a limitation; the second group of gate bus lines 41b may include a plurality of first gate bus lines 41b1. In that case, all of the plurality of first gate bus lines 41b1 may be connected to the interconnect 46, or some (e.g., one) of the plurality of first gate bus lines 41b1 may be connected to the interconnect 46.

According to an embodiment of the present invention, a liquid crystal display device that is suitably used as a cut display can be provided. Embodiments of the present invention are broadly applicable to liquid crystal display devices (cut displays) of various sizes, specifications, and/or display modes.

The present application claims the benefit of U.S. Provisional Application No. 63/045,465 filed on Jun. 29, 2020, the disclosure of which is hereby incorporated by reference in its entirety.

What is claimed is:

1. A liquid crystal display device having a plurality of pixels arranged in a matrix including multiple rows and multiple columns, comprising:
   a liquid crystal display panel, including a first substrate, a second substrate opposed to the first substrate, a liquid crystal layer interposed between the first substrate and the second substrate, a plurality of gate bus lines extending along a row direction, and a plurality of source bus lines extending along a column direction; and
   a gate bus line driving circuit and a source bus line driving circuit, wherein,
   the plurality of pixels are disposed in a pixel array region, the pixel array region including:
      a first region where arbitrary displaying takes place; and
      a second region where exclusively black displaying takes place, the second region adjoining the first region along the column direction;
   the plurality of gate bus lines include a first group of gate bus lines disposed in the first region and a second group of gate bus lines disposed in the second region; and
   the second group of gate bus lines include a first gate bus line connected to the gate bus line driving circuit and a plurality of second gate bus lines connected to the first gate bus line via an interconnect.

2. The liquid crystal display device of claim 1, wherein the plurality of second gate bus lines comprise five or more gate bus lines.

3. The liquid crystal display device of claim 1, wherein, the pixel array region further includes a third region adjoining the second region along the column direction and being located on an opposite side of the second region from the first region;
   the plurality of gate bus lines further include a third group of gate bus lines disposed in the third region; and
   the third group of gate bus lines are not connected to the gate bus line driving circuit.

4. The liquid crystal display device of claim 3 further comprising a bezel that covers a portion of the second region and the third region when viewed from a normal direction of the display surface.

5. The liquid crystal display device of claim 1, wherein,
   the first substrate comprises the plurality of gate bus lines, the plurality of source bus lines, and the interconnect; and
   the interconnect is provided above or below the second group of gate bus lines via an insulating layer, each of the second group of gate bus lines being connected to the interconnect through a contact hole made in the insulating layer.

6. The liquid crystal display device of claim 1, wherein the interconnect is made of a same electrically conductive film as the plurality of source bus lines.

7. A method of producing a liquid crystal display device that is a resized version of an original liquid crystal display device, the method comprising:
   step (a) of providing a liquid crystal display device that includes a liquid crystal display panel having a plurality of gate bus lines extending along a row direction and a plurality of source bus lines extending along a column direction;
   step (b) of distinguishing the liquid crystal display panel of the liquid crystal display device into a reused region to be reused and a cut-off region to be cut off, and cutting the liquid crystal display panel at a boundary between the reused region and the cut-off region; and
   step (c) of forming a sealing portion at a cutting surface having been created in the reused region at step (b), wherein,
   the liquid crystal display panel of the liquid crystal display device provided at step (a) further includes an interconnect extending along the column direction, the interconnect intersecting all or some of the plurality of gate bus lines via an insulating layer;
   the reused region after being subjected to step (b) includes a plurality of gate bus lines that are connected to a gate bus line driving circuit and a plurality of gate bus lines that are not connected to the gate bus line driving circuit; and
   the method comprises, after step (b), step (d) of causing at least one gate bus line among the plurality of gate bus lines that are connected to the gate bus line driving circuit and two or more gate bus lines among the plurality of gate bus lines that are not connected to the gate bus line driving circuit to become connected via the interconnect.

8. The method of producing a liquid crystal display device of claim 7, further comprising, after step (d), step (e) of separating the interconnect into a continuous first portion that includes a portion intersecting the at least one gate bus line and the two or more gate bus lines; and a second portion other than the first portion.

* * * * *